(12) United States Patent
Ma et al.

(10) Patent No.: US 11,300,822 B2
(45) Date of Patent: Apr. 12, 2022

(54) DISPLAY PANEL, METHOD FOR MANUFACTURING THE SAME, DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Xinli Ma, Beijing (CN); Bingyang Liu, Beijing (CN); Xueqiang Qian, Beijing (CN); Dongchuan Chen, Beijing (CN); Kaixuan Wang, Beijing (CN)

(73) Assignees: Beijing BOE Display Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 16/851,312

(22) Filed: Apr. 17, 2020

(65) Prior Publication Data
US 2021/0157187 A1 May 27, 2021

(30) Foreign Application Priority Data
Nov. 21, 2019 (CN) .......................... 201911151425.1

(51) Int. Cl.
| | |
|---|---|
| *G02F 1/1333* | (2006.01) |
| *G02F 1/1335* | (2006.01) |
| *G02F 1/13357* | (2006.01) |
| *G06K 9/00* | (2022.01) |

(52) U.S. Cl.
CPC .... *G02F 1/13338* (2013.01); *G02F 1/133512* (2013.01); *G02F 1/133514* (2013.01); *G02F 1/133528* (2013.01); *G02F 1/133602* (2013.01); *G06K 9/0004* (2013.01); *G02F 2201/123* (2013.01)

(58) Field of Classification Search
None
See application file for complete search history.

(56) References Cited

U.S. PATENT DOCUMENTS

| 2018/0060641 A1 | 3/2018 | Kim et al. |
| 2020/0183211 A1* | 6/2020 | Weng ................ G02F 1/133606 |
| 2020/0226341 A1 | 7/2020 | He et al. |
| 2020/0242320 A1 | 7/2020 | Zeng et al. |

FOREIGN PATENT DOCUMENTS

| CN | 109037474 A | 12/2018 |
| CN | 109858398 A | 6/2019 |
| CN | 109858434 A | 6/2019 |
| CN | 110472617 A | 11/2019 |

* cited by examiner

*Primary Examiner* — James A Dudek
(74) *Attorney, Agent, or Firm* — The Webb Law Firm

(57) ABSTRACT

The present disclosure provides a display panel, a method for manufacturing the same, and a display device. A display panel comprising a first substrate, a second substrate, a light source layer, an optical sensor, and an imaging section; wherein, the optical sensor, the first substrate, the imaging section, and the second substrate are sequentially stacked on a side of the light source layer; or the optical sensor, the light source layer, the imaging section, and the second substrate are sequentially stacked on a side of the first substrate, and the imaging section includes at least one through hole that allows light to pass through, and the imaging section is configured to image a surface of an object located near a surface of the display panel onto the optical sensor by way of pin hole imaging.

17 Claims, 4 Drawing Sheets

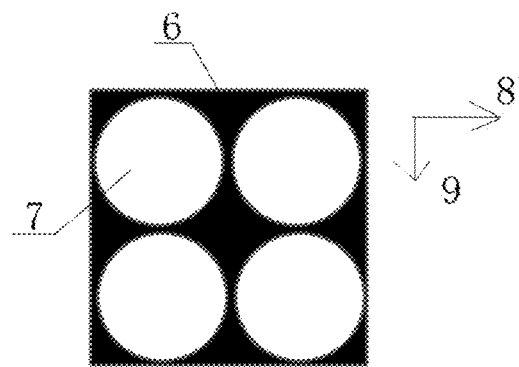
FIG. 4
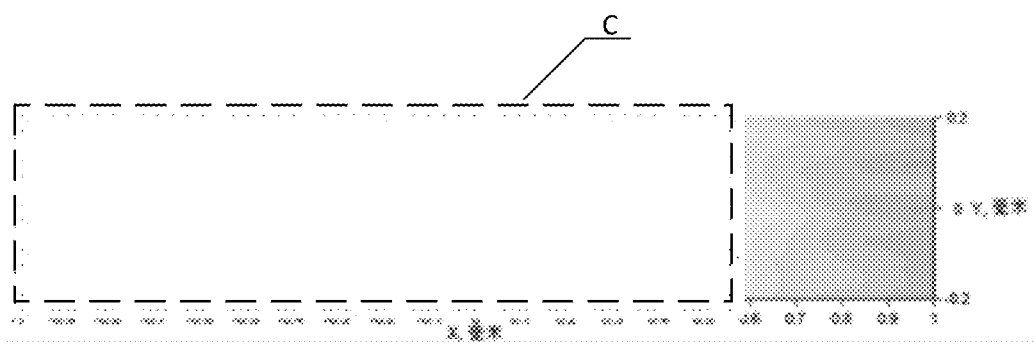
FIG. 5
E           E
FIG. 6

DISPLAY PANEL, METHOD FOR
MANUFACTURING THE SAME, DISPLAY
DEVICE

CROSS REFERENCE TO RELATED APPLICATION

This application claims priority to Chinese Patent Application No. 201911151425.1, filed on Nov. 21, 2019, the disclosure of which is hereby incorporated by reference in its entirety.

TECHNICAL FIELD

The present disclosure relates to the field of display technology, and in particular to a display panel, a method for manufacturing the same, and a display device.

BACKGROUND

With the continuous improvement of living standards, various terminal devices have become necessities in life, and users' requirements for terminal devices have become higher and higher. For security, because fingerprints have unique characteristics for a individual, which makes fingerprint recognition have excellent privacy protection functions, fingerprint recognition is widely used in various terminal devices to increase user experience and security.

In a conventional display, such as a liquid crystal display, a fingerprint sensor is disposed on a side of the color filter substrate away from the liquid crystal layer. When the user's finger touches the outermost glass cover, the light from the backlight is reflected back to the fingerprint sensor by the fingerprint on the finger. With the light intensity difference reflected by the fingerprint peak and fingerprint valley and with the photoelectric conversion of the fingerprint sensor, the fingerprint recognition is achieved.

SUMMARY

In a first aspect of the present disclosure, there is provide a display panel comprising a first substrate, a second substrate, a light source layer, an optical sensor, and an imaging section; wherein, the optical sensor, the first substrate, the imaging section, and the second substrate are sequentially stacked on a side of the light source layer; or the optical sensor, the light source layer, the imaging section, and the second substrate are sequentially stacked on a side of the first substrate, and the imaging section includes at least one through hole that allows light to pass through, and the imaging section is configured to image a surface of an object located near a surface of the display panel onto the optical sensor by way of pin hole imaging.

In some embodiments of the present disclosure, the through hole is hollow or filled with a transparent material.

In some embodiments of the present disclosure, the optical sensor includes a plurality of sub-sensors, and a projection of each sub-sensor on the first substrate at least partially overlap with the projection of one or more of the through holes on the first substrate.

In some embodiments of the present disclosure, the imaging section includes a plurality of the through holes arranged in an array.

In some embodiments of the present disclosure, a shape of a cross-section of the through hole parallel to the first substrate is one of a circle, an oval, or a polygon.

In some embodiments of the present disclosure, when the shape of the cross-section of the through hole is a square, a distance between two oppositely disposed sides in the cross section of each of the through hole is 0.1 mm to 2 mm; and a distance between two adjacent through holes is 10 μm to 100 μm.

In some embodiments of the present disclosure, when the shape of the cross-section of the through hole is circular, a diameter of the cross-section of the through hole is 0.1 mm to 2 mm; and a distance between two adjacent through holes is 10 μm to 100 μm.

In some embodiments of the present disclosure, a material of the imaging section is one of a resin material or a metal material that is opaque.

In some embodiments of the present disclosure, the light source layer comprises: a backlight source, an array substrate, a pixel electrode, a liquid crystal layer, a protection layer, and a color filter layer, which are sequentially stacked, the color filter layer includes a gate black matrix, the optical sensor includes a plurality of sub-sensors, and a projection of the sub-sensors on the first substrate overlaps a projection of a gate black matrix of the color filter layer on the first substrate, and the display panel further includes a polarizer disposed on a side of the imaging section adjacent the color filter layer, or on a side of the imaging section away from the color filter layer.

In some embodiments of the present disclosure, the light source layer includes an anode, a light emitting layer, a cathode, and an encapsulation layer which are sequentially overlapped on a side of the optical sensor away from the first substrate.

In some embodiments of the present disclosure, the optical sensor is a fingerprint sensor.

In a second aspect of the present disclosure, there is provided a display device, comprising: the display panel according to the present disclosure.

In a third aspect of the present disclosure, there is provided a method for manufacturing a display panel, comprising providing an optical sensor on one side of a first substrate; providing an imaging section on the other side of the first substrate, the imaging section including at least one through hole that allows light to pass through, and the imaging section being configured to image a surface of an object located near a surface of the display panel onto the optical sensor by way of pin hole imaging; providing a light source layer on a side of the optical sensor away from the first substrate; and providing a second substrate on a side of the imaging section away from the first substrate.

In some embodiments of the present disclosure, the optical sensor includes a plurality of sub-sensors, and providing a light source layer on a side of the optical sensor away from the first substrate includes: providing a color filter layer and a protection layer sequentially on a side of the optical sensor away from the first substrate, so that projections of the sub-sensors on the first substrate and the projection of the gate black matrix of the color filter layer on the first substrate overlap; and aligning a side of the first substrate on which the protection layer is provided with an array substrate having pixel electrodes, and injecting liquid crystal to form a liquid crystal layer.

In some embodiments of the present disclosure, before providing the imaging section on the other side of the first substrate, the method further comprises providing a polarizer on the other side of the first substrate, providing the imaging section on the other side of the first substrate includes providing the imaging section on a side of the polarizer away from the first substrate.

In some embodiments of the present disclosure, after providing the imaging section on the other side of the first substrate and before providing the second substrate on a side of the imaging section away from the first substrate, the method further comprising: providing a polarizer on a side of the imaging section away from the first substrate, providing the second substrate on a side of the imaging section away from the first substrate includes providing the second substrate on a side of the polarizer away from the imaging section.

In some embodiments of the present disclosure, the optical sensor is a fingerprint sensor.

In a fourth aspect of the present disclosure, there is provided a method for manufacturing a display panel, comprising providing an optical sensor, a light source layer and an imaging section sequentially on a side of the first substrate, the imaging section including at least one through hole that allows light to pass through, and the imaging section being configured to image a surface of an object located near a surface of the display panel onto the optical sensor by way of pin hole imaging; and providing a second substrate on a side of the imaging section away from the light source layer.

In some embodiments of the present disclosure, in the process of providing an optical sensor, a light source layer and an imaging section sequentially on a side of the first substrate, providing the light source layer includes providing an anode, a light emitting layer, a cathode, and a packaging layer sequentially on a side of the optical sensor away from the first substrate.

In some embodiments of the present disclosure, the optical sensor is a fingerprint sensor.

The above description is only an overview of the technical solutions of the embodiments of the present disclosure. In order to understand the technical means of the embodiments of the present disclosure more clearly, it can be implemented according to the content of the description. The advantages can be more clearly understood, and specific implementations of the embodiments of the present disclosure are given below.

BRIEF DESCRIPTION OF THE DRAWINGS

Various other advantages and benefits will become clear to those of ordinary skill in the art upon reading the detailed description of the embodiments below. The drawings are only for the purpose of illustrating embodiments and are not to be considered as limiting the embodiments of the present disclosure. Moreover, in the drawings, the same reference numerals are used to refer to the same parts.

FIG. 4 is a schematic structural diagram when the through holes are circular in the imaging section of the embodiment of the present disclosure;

FIG. 5 is an imaging diagram on a fingerprint sensor when an imaging section is not provided in the prior art;

FIG. 6 is an imaging diagram on a fingerprint sensor when an imaging section is provided according to an embodiment of the present disclosure;

DETAILED EMBODIMENTS

Figure 1:
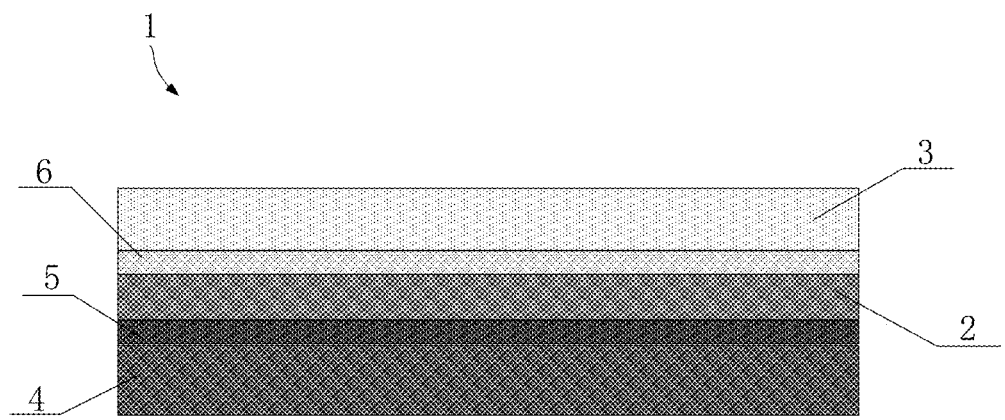
FIG. 1 is a schematic structural diagram of a first embodiment of a display panel of the present disclosure.

Hereinafter, exemplary embodiments of the present disclosure will be described in more detail with reference to the accompanying drawings. Although exemplary embodiments of the present disclosure are shown in the drawings, it should be understood that the present disclosure can be implemented in various forms and should not be limited by the embodiments set forth herein. On the contrary, these embodiments are provided to enable a thorough understanding of the present disclosure, and to fully convey the scope of the present disclosure to those skilled in the art.

Those skilled in the art will understand that, unless specifically stated otherwise, the singular forms "a", "an", "said" and "the" may include plural forms. It should be further understood that the term "including" used in the specification of the present disclosure refers to the presence of the described features, integers, steps, operations, elements and/or components, but does not exclude the presence or addition of one or more other features, integers, steps, operations, elements, components, and/or groups thereof. It should be understood that the term "and/or" used herein includes all or any unit and all combinations of one or more of the associated listed items.

It will be understood by those skilled in the art that, unless otherwise defined, all terms (including technical and scientific terms) used herein have the same meaning as commonly understood by one of ordinary skill in the art to which this disclosure belongs. It should also be understood that terms such as those defined in the general dictionary should be understood to have meanings consistent with the meanings in the context of the prior art, and unless specifically defined here, they would not be explained with idealized or overly formal meaning.

In a conventional liquid crystal display, a fingerprint sensor may be disposed on one side of the color filter layer. Specifically, the light emitted by the backlight source is reflected by the fingerprint back to the fingerprint sensor after passing through the liquid crystal display panel and the glass cover. Using the difference in the light intensity reflected by the fingerprint peak and the fingerprint valley on the fingerprint, the photoelectric conversion of the fingerprint sensor can realize fingerprint recognition. However, the applicant discovered that the light divergence angle formed on the fingerprint sensor on the color filter layer side is large due to the large divergence angle of the backlight source and the emitted light passing through a long transmission path, and the formed light spot is large. The profile of the fingerprint cannot be distinguished with the large light spot, which will cause a decrease in recognition ability.

Figure 2:
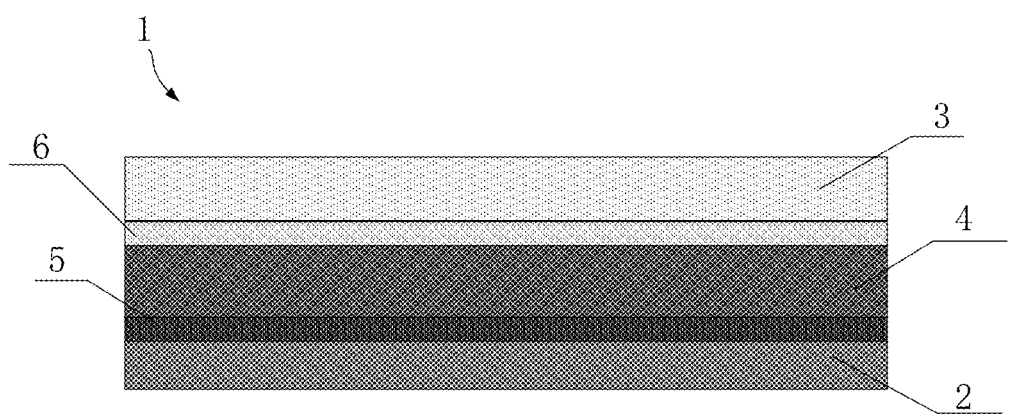
FIG. 2 is a schematic structural diagram of a second embodiment of a display panel of the present disclosure.

In order to solve the above technical problems, in a first aspect, FIG. 1 shows a schematic structural diagram of a first embodiment of a display panel of the present disclosure. As shown in FIG. 1, the display panel 1 includes a first substrate 2, a second substrate 3, a light source layer 4, a fingerprint sensor 5, and an imaging section 6. On one side of the light source layer 4, a fingerprint sensor 5, a first substrate 2, an imaging section 6, and a second substrate 3 are sequentially stacked. FIG. 2 is a schematic structural diagram of a second embodiment of a display panel of the present disclosure. As shown in FIG. 2, a fingerprint sensor 5, a light source layer 4, an imaging section 6, and a second substrate 3 are sequentially stacked on one side of the first substrate 2.

Figure 3:
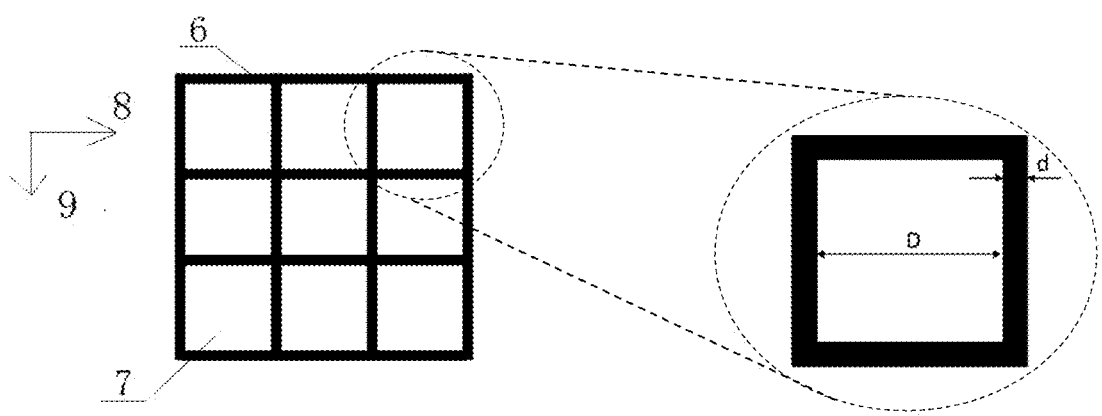
FIG. 3 is a schematic structural diagram when the through holes are square in an imaging section of an embodiment of the present disclosure.

FIG. 3 and FIG. 4 are schematic structural diagrams of a through hole of the imaging section 6 according to an embodiment of the present disclosure. The imaging section 6 has one or more through holes 7, and the positions of the through holes 7 correspond to the positions of the fingerprint sensor 5. For example, the fingerprint sensor 5 may include one or more sub-sensors, and the projection of each sub-sensor on the first substrate 2 at least partially overlaps with the projection of one or more of the through holes 7 on the first substrate 2. The through holes 7 utilize the pin hole imaging principle to image the light reflected by the fingerprint on the finger onto the fingerprint sensor 5, and the light is emitted by the light source layer 4.

Since the imaging section 6 with through holes 7 are provided on the light source layer 4, the imaging section 6 permit the light to pass through, and the light reflected by the fingerprint irradiates onto the fingerprint sensor 5. Using the principle of pin hole imaging, the shape of the fingerprint can be presented on the fingerprint sensor 5, so that it can be recognized by the fingerprint sensor 5, thereby improving the fingerprint recognition capability.

As shown in FIG. 3 to FIG. 4, on a cross section parallel to the first substrate 2, a plurality of through holes 7 are arranged side by side in a first direction 8 and a second direction 9, and the first direction 8 intersects the second direction 9 at a right angle. Since the through-holes 7 are arranged side by side, the difficulty of manufacturing the imaging section 6 is simplified, which facilitates light to pass through the through holes 7 and further improves the recognition effect.

The cross-sectional shape of the through holes 7 parallel to the first substrate 2 can be designed according to different requirements, enhancing the practicability of the product. For example, the cross-sectional shape of the through holes 7 may be one of a circle, a square, and other polygons.

Further referring to FIG. 3, when the cross-sectional shape of the through hole 7 is a square, the distance D between two oppositely disposed sides in the cross section of each through hole 7 may be 0.1 mm to 2 mm. At the same time, the distance d between two adjacent through holes 7 may be 10 µm to 100 µm. Therefore, the shape of the through holes 7 is designed according to different requirements to enhance the practicability of the product.

In another embodiment, referring further to FIG. 4, when the cross-sectional shape of the through-hole 7 is circular, the cross-sectional diameter of the through-hole 7 may be 0.1 mm to 2 mm, and the distance between two adjacent through-holes 7 can be from 10 µm to 100 µm. Therefore, the shape of the through holes 7 is designed according to different requirements to enhance the practicability of the product.

FIG. 5 shows a schematic image of a fingerprint formed on the fingerprint sensor 5 when the imaging section 6 is not provided. FIG. 6 shows a schematic image of a fingerprint formed on the fingerprint sensor 5 when the imaging section 6 is provided. Xi and Yi in FIG. 5 and FIG. 6 represent the X-axis and Y-axis, respectively, the coordinate value on the X-axis is −1 to 1, and the coordinate value on the Y-axis is −0.2 to 0.2, and the unit is millimeter. The area C of FIG. 5 includes a light spot projected by the fingerprint on the fingerprint sensor 5. The area C includes two light spots of fingerprints, each of which has a large area and the two light spots overlap, which is difficult to separate and makes it difficult to identify. There are two areas E in FIG. 6, and each area E includes a light spot of a fingerprint. The light spot area shown in FIG. 6 is significantly smaller than the light spot area shown in FIG. 5, and the two light spots in FIG. 6 is separated and easy to identify. This shows that since the display panel of the embodiment of the present disclosure is provided with the imaging section 6 and utilizes the principle of the pin hole imaging of the through holes 7, the shape of the fingerprint can be more convergently projected on the fingerprint sensor 5. Different fingerprints are projected on the fingerprint sensor 5 with light spots of a large interval therebetween. This can improve the fingerprint sensor 5's recognition rate and recognition accuracy on the fingerprint, and thus improve the fingerprint recognition ability.

In some embodiments according to the present disclosure, the material of the imaging section 6 may be a resin material or a metal material (for example, an opaque metal material such as molybdenum (Mo)). In an exemplary embodiment, the imaging section 6 is made of an opaque resin material, and may form the black matrix.

Further, in some embodiments according to the present disclosure, the through-holes 7 of the imaging section 6 may be filled with air (ie, hollow), or a transparent material such as a transparent resin or the like may be filled in the through-holes 7.

It should be noted that the imaging section 6 of the embodiment of the present disclosure is suitable for an LCD liquid crystal display or an organic light emitting diode (OLED) display.

Figure 7:
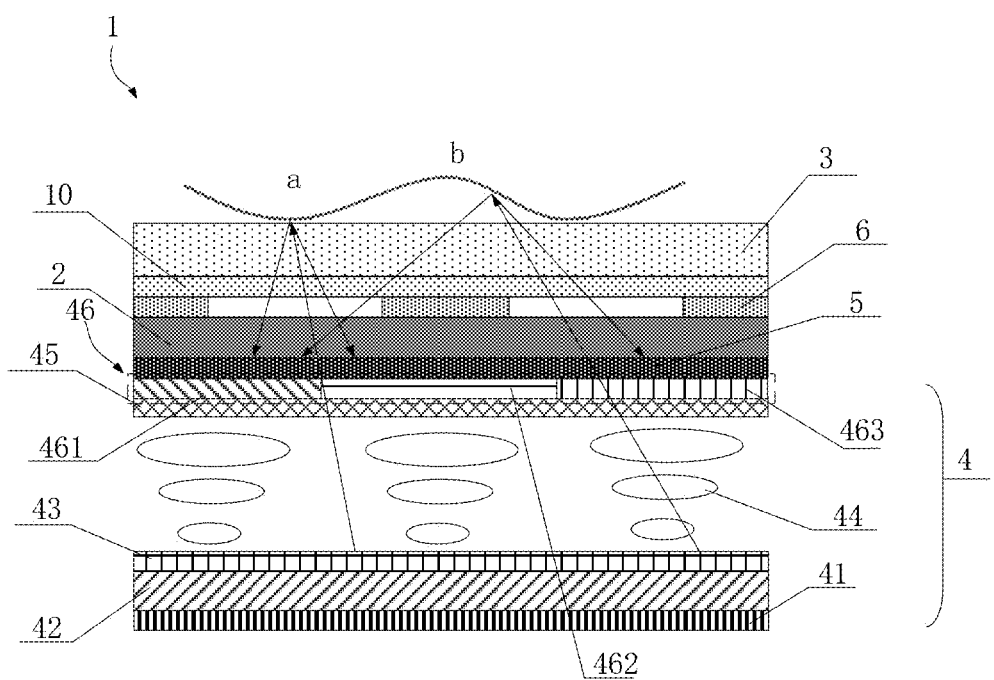
FIG. 7 is a schematic structural diagram of a display panel of the present disclosure used in a liquid crystal display.

FIG. 7 is a schematic structural diagram of a display panel of a liquid crystal display according to an embodiment of the present disclosure. As shown in FIG. 7, when this embodiment is used in a liquid crystal display, the light source layer 4 includes: a backlight 41, an array substrate 42, a pixel electrode 43, a liquid crystal layer 44, a protection layer 45, and a color filter layer 46 that are sequentially stacked. The color filter layer 46 includes red sub-pixels 461, green sub-pixels 462, and blue sub-pixels 463. The projection of the fingerprint sensor 5 on the first substrate 2 overlaps with the projection of the gate black matrix (BM) of the color filter layer 46 on the first substrate 2. For example, the projection of the fingerprint sensor 5 on the first substrate 2 is within the range of the projection of the gate BM of the color filter layer 46 on the first substrate 2.

In the embodiment according to the present disclosure, the display panel 1 further includes a polarizer 10 disposed on a side of the imaging section 6 close to the color filter layer 46 or on a side of the imaging section 6 away from the color filter layer 46.

Figure 8:
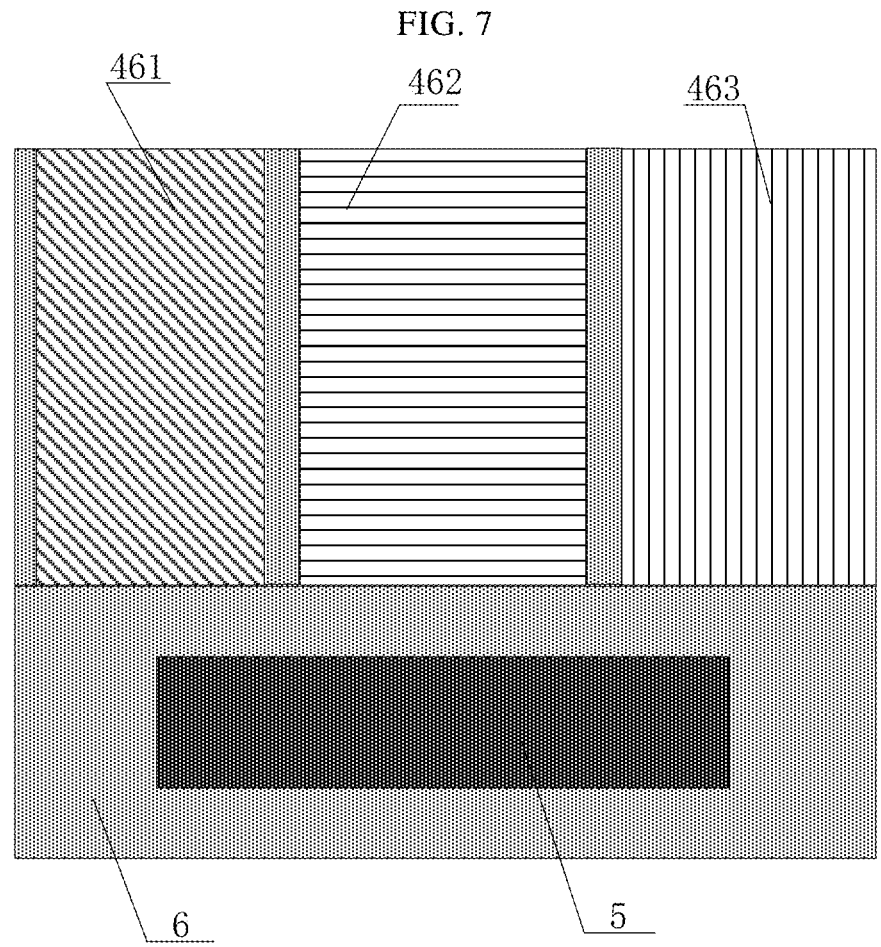
FIG. 8 is a top view of an imaging section, a fingerprint sensor, and each sub-pixel according to an embodiment of the present disclosure.

FIG. 8 is a top view of the imaging section 6, the fingerprint sensor 5 and the sub-pixels according to the embodiment of the present disclosure. As shown in FIG. 8, the fingerprint sensor 5 may include a plurality of sub-sensors. Each sub-sensor is disposed at the position of the gate of the first substrate 2 and is covered by the imaging section 6. Since the imaging section 6 itself has through-holes 7, the projection of each sub-sensor on the first substrate 2 and the projections one or more of the through-holes 7 on the first substrate 2 are at least partially overlapped, so that each sub-sensor can receive the light reflected by the fingerprint peak a and the fingerprint valley b (refer to FIG. 7) through the corresponding through hole(s) 7.

Figure 9:
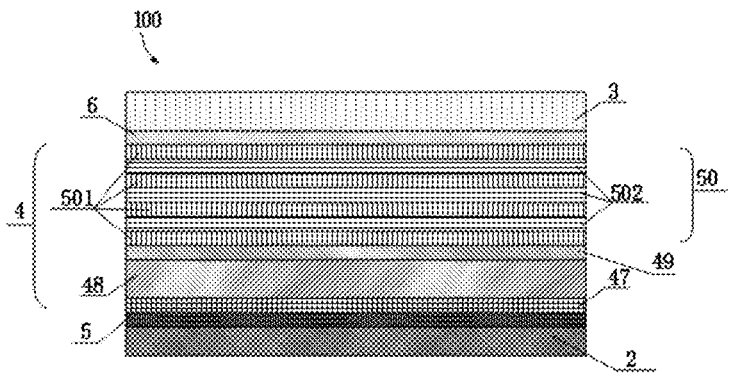
FIG. 9 is a schematic structural diagram of a display panel used in an organic light emitting diode display according to an embodiment of the present disclosure.

FIG. 9 is a schematic structural diagram of a display panel used in an organic light emitting diode display according to an embodiment of the present disclosure. As shown in FIG. 9, in the organic light emitting diode (OLED) display 100, the light source layer 4 includes: an anode 47, a light emitting layer 48, a cathode 49, and an encapsulation layer 50 disposed on a side of the fingerprint sensor 5 away from the first substrate 2 in order to realize the improvement of fingerprint recognition ability in the organic light emitting diode displays. The encapsulation layer 50 includes an organic layer 501 and an inorganic layer 502 which are provided in sequence.

An embodiment of the present disclosure discloses a display device including a display panel 1 according to an embodiment of the present disclosure. Since the display device includes the display panel 1, the display device has the same advantageous technical effects as the display panel 1. Therefore, the advantageous effects of the display device according to the embodiments of the present disclosure are not repeated here.

In addition, in the above embodiment of the display panel according to the present disclosure, the fingerprint sensor is taken as an example for description. However, it should be understood that the present disclosure is not limited to the fingerprint sensor, but may be any suitable optical sensor. Accordingly, in the display panel of the embodiment of the present disclosure, the imaging section may use the pin hole imaging method to image the surface of any object located near the surface of the display panel onto the optical sensor, which is not limited in this disclosure.

Figure 10:
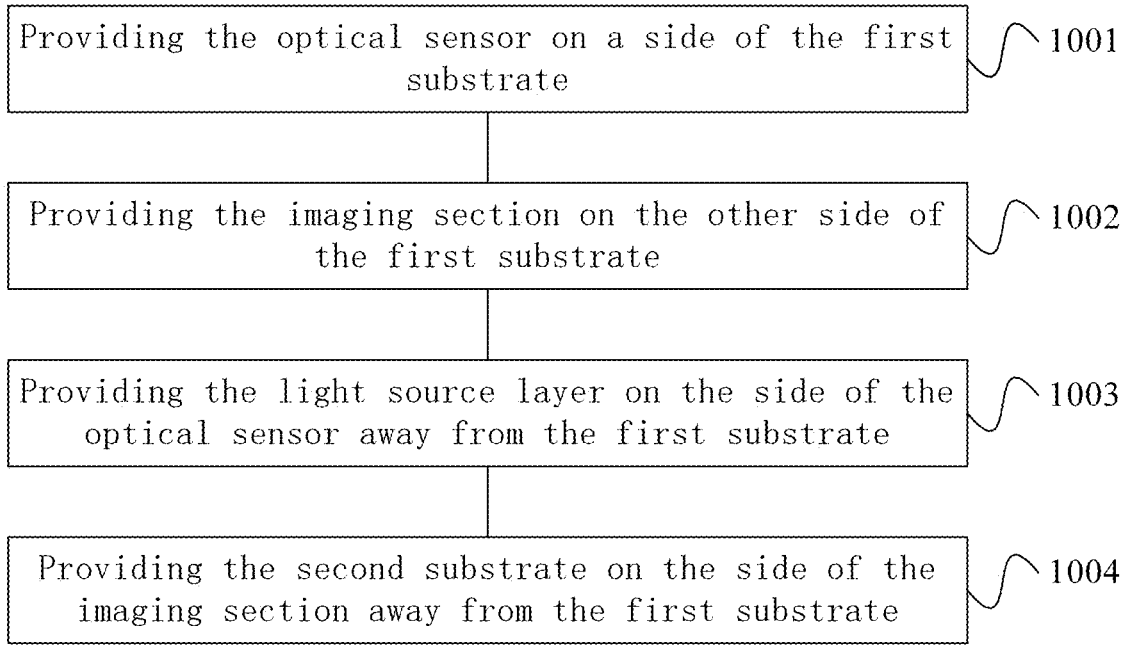
FIG. 10 illustrates a flowchart of a method of manufacturing a display panel according to an embodiment of the present disclosure.

FIG. 10 illustrates a method of manufacturing a display panel according to an embodiment of the present disclosure. As shown in FIG. 10, the method includes:

setting an optical sensor on one side of the first substrate 2 (step 1001);

providing an imaging section 6 on the other side of the first substrate 2 (step 1002). The imaging section 6 has at least one through hole 7 that allows light to pass through and is configured to image, by way of pin hole imaging, a surface of an object near a surface of the display panel on the optical sensor;

providing a light source layer 4 on a side of the optical sensor away from the first substrate 2 (step 1003); and providing a second substrate 3 on a side of the imaging section 6 away from the first substrate 2 (step 1004).

Figure 11:
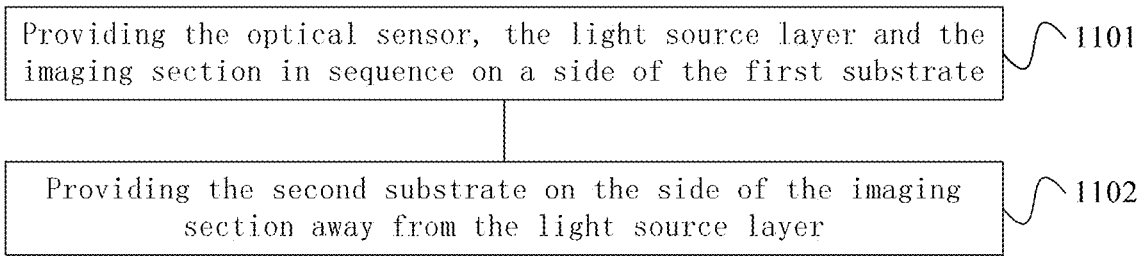
FIG. 11 illustrates a flowchart of a method of manufacturing a display panel according to an embodiment of the present disclosure.

FIG. 11 illustrates a method of manufacturing a display panel according to an embodiment of the present disclosure. As shown in FIG. 11, the method includes:

providing an optical sensor, a light source layer 4 and an imaging section 6 sequentially on a side of a first substrate 2 (step 1101). The imaging section 6 has at least one through hole 7 that allows light to pass through and is configured to image, by way of pin hole imaging, a surface of an object near the surface of the display panel onto the optical sensor; and providing a second substrate 3 on a side of the imaging section 6 away from the light source layer 4 (step 1102).

Since the imaging section 6 having the through hole(s) 7 is provided on the light source layer, and the imaging section 6 allows light to pass through, the light reflected back by the surface (such as a fingerprint) of an object located near the surface of the display panel may pass through the through hole(s) 7 and irradiate on the optical sensor. By the principle of pin hole imaging with the through hole(s) 7, the shape of the texture of the surface of the object (such as the shape of a fingerprint) can be relatively convergently presented on the optical sensor. Different textures on the surface of the object have a large gap between the images on the optical sensor, which can improve the performance of the optical sensor such as the recognition rate and accuracy of the texture on the surface of the object, and thus improve the ability to recognize the texture.

In some embodiments according to the present disclosure, the optical sensor may include a plurality of sub-sensors, and the light source layer 4 may be provided on a side of the optical sensor away from the first substrate 2, including: sequentially disposing the color filter layer 46 and the protection layer 45 on a side of the optical sensor away from the first substrate 2, such that the projection of the sub-sensors on the first substrate 2 and the projection of the gate black matrix of the color filter layer 46 on the first substrate 2 are overlapped; a side of the first substrate 2 on which the protection layer 45 is provided is aligned with the array substrate 42 having the pixel electrodes 43, and liquid crystal is injected to form a liquid crystal layer 44.

Specifically, the display panel can be manufactured in a conventional manner. For example, after the optical sensor is disposed on one side of the first substrate, an isolation layer is further formed on the optical sensor to protect the optical sensor. Subsequently, the production of red sub-pixels, green sub-pixels, blue sub-pixels, columnar spacers, imaging sections, etc. is completed by using manufacturing processes such as exposure and development. The traditional process is also used to complete the remaining parts of the liquid crystal display panel such as the array glass substrate, the alignment, the filling of the crystal, and the binding.

In some embodiments according to the present disclosure, before the imaging section 6 is provided on the other side of the first substrate 2, the method may further include: providing a polarizer 10 on the other side of the first substrate 2. Providing the imaging section 6 on the other side of the first substrate 2 includes: providing the imaging section 6 on the side of the polarizer 10 away from the first substrate 2.

In some embodiments according to the present disclosure, after the imaging section 6 is disposed on the other side of the first substrate 2 and before the second substrate 3 is disposed on the side of the imaging section 6 away from the first substrate 2, the method may further include: providing the polarizer 10 on the side of the imaging section 6 away from the first substrate 2. Providing the second substrate 3 on the side of the imaging section 6 away from the first substrate 2 includes providing the second substrates 3 on the side of the polarizer 10 away from the imaging section 6.

In some embodiments according to the present disclosure, in the process of sequentially disposing an optical sensor, a light source layer 4, an imaging section 6, and a second substrate 3 on a layer of the first substrate 2, the step of providing the light source layer 4 may include: on one side of the optical sensor away from the first substrate 2, sequentially providing an anode 47, a light emitting layer 48, a cathode 49, and an encapsulating layer 50, so as to improve the fingerprint recognition capability in the organic light emitting diode display.

The above are only part of the embodiments of the present disclosure. It should be noted that, for those of ordinary skill in the art, without departing from the principles of the present disclosure, many other modifications and alterations can be made. These modifications and alterations should also be considered as the scope of protection of the present disclosure.

The invention claimed is:

1. A display panel comprising a first substrate, a second substrate, a light source layer, an optical sensor, and an imaging section;
   wherein, the optical sensor, the first substrate, the imaging section, and the second substrate are sequentially stacked on a side of the light source layer, and
   the imaging section includes at least one through hole that allows light to pass through, and the imaging section is configured to image a surface of an object located near a surface of the display panel onto the optical sensor by way of pin hole imaging,
   the light source layer comprises: a backlight source, an array substrate, a pixel electrode, a liquid crystal layer, a protection layer, and a color filter layer, which are sequentially stacked.

2. The display panel according to claim 1, wherein the through hole is hollow or filled with a transparent material.

3. The display panel according to claim 1, wherein the optical sensor includes a plurality of sub-sensors, and a projection of each sub-sensor on the first substrate at least partially overlap with the projection of one or more of the through holes on the first substrate.

4. The display panel according to claim 1, wherein the imaging section includes a plurality of the through holes arranged in an array.

5. The display panel according to claim 1, wherein a shape of a cross-section of the through hole parallel to the first substrate is one of a circle, an oval, or a polygon.

6. The display panel according to claim 5, wherein when the shape of the cross-section of the through hole is a square, a distance between two oppositely disposed sides in the cross section of each of the through hole is 0.1 mm to 2 mm; and a distance between two adjacent through holes is 10 μm to 100 μm.

7. The display panel according to claim 5, wherein when the shape of the cross-section of the through hole is circular, a diameter of the cross-section of the through hole is 0.1 mm to 2 mm; and a distance between two adjacent through holes is 10 μm to 100 μm.

8. The display panel according to claim 1, wherein a material of the imaging section is one of a resin material or a metal material that is opaque.

9. The display panel according to claim 1, wherein the color filter layer includes a gate black matrix, the optical sensor includes a plurality of sub-sensors, and a projection of the sub-sensors on the first substrate overlaps a projection of a gate black matrix of the color filter layer on the first substrate, and
   the display panel further includes a polarizer disposed on a side of the imaging section adjacent the color filter layer, or on a side of the imaging section away from the color filter layer.

10. The display panel according to claim 1, wherein the light source layer includes an anode, a light emitting layer, a cathode, and an encapsulation layer which are sequentially overlapped on a side of the optical sensor away from the first substrate.

11. The display panel according to claim 1, wherein the optical sensor is a fingerprint sensor.

12. A display device, comprising: the display panel according to claim 1.

13. A method for manufacturing a display panel, comprising
   providing an optical sensor on one side of a first substrate;
   providing an imaging section on the other side of the first substrate, the imaging section including at least one through hole that allows light to pass through, and the imaging section being configured to image a surface of an object located near a surface of the display panel onto the optical sensor by way of pin hole imaging;
   providing a light source layer on a side of the optical sensor away from the first substrate; and
   providing a second substrate on a side of the imaging section away from the first substrate,
   wherein the light source layer comprises: a backlight source, an array substrate, a pixel electrode, a liquid crystal layer, a protection layer, and a color filter layer, which are sequentially stacked.

14. The method according to claim 13, wherein the optical sensor includes a plurality of sub-sensors, and providing a light source layer on a side of the optical sensor away from the first substrate includes:
   providing a color filter layer and a protection layer sequentially on a side of the optical sensor away from the first substrate, so that projections of the sub-sensors on the first substrate and the projection of the gate black matrix of the color filter layer on the first substrate overlap; and
   aligning a side of the first substrate on which the protection layer is provided with an array substrate having pixel electrodes, and injecting liquid crystal to form a liquid crystal layer.

15. The method according to claim 13, wherein before providing the imaging section on the other side of the first substrate, the method further comprises providing a polarizer on the other side of the first substrate,
   providing the imaging section on the other side of the first substrate includes providing the imaging section on a side of the polarizer away from the first substrate.

16. The method according to claim 13, wherein after providing the imaging section on the other side of the first substrate and before providing the second substrate on a side of the imaging section away from the first substrate, the method further comprising: providing a polarizer on a side of the imaging section away from the first substrate,
   providing the second substrate on a side of the imaging section away from the first substrate includes providing the second substrate on a side of the polarizer away from the imaging section.

17. The method according to claim 13, wherein the optical sensor is a fingerprint sensor.

* * * * *